UNITED STATES PATENT OFFICE.

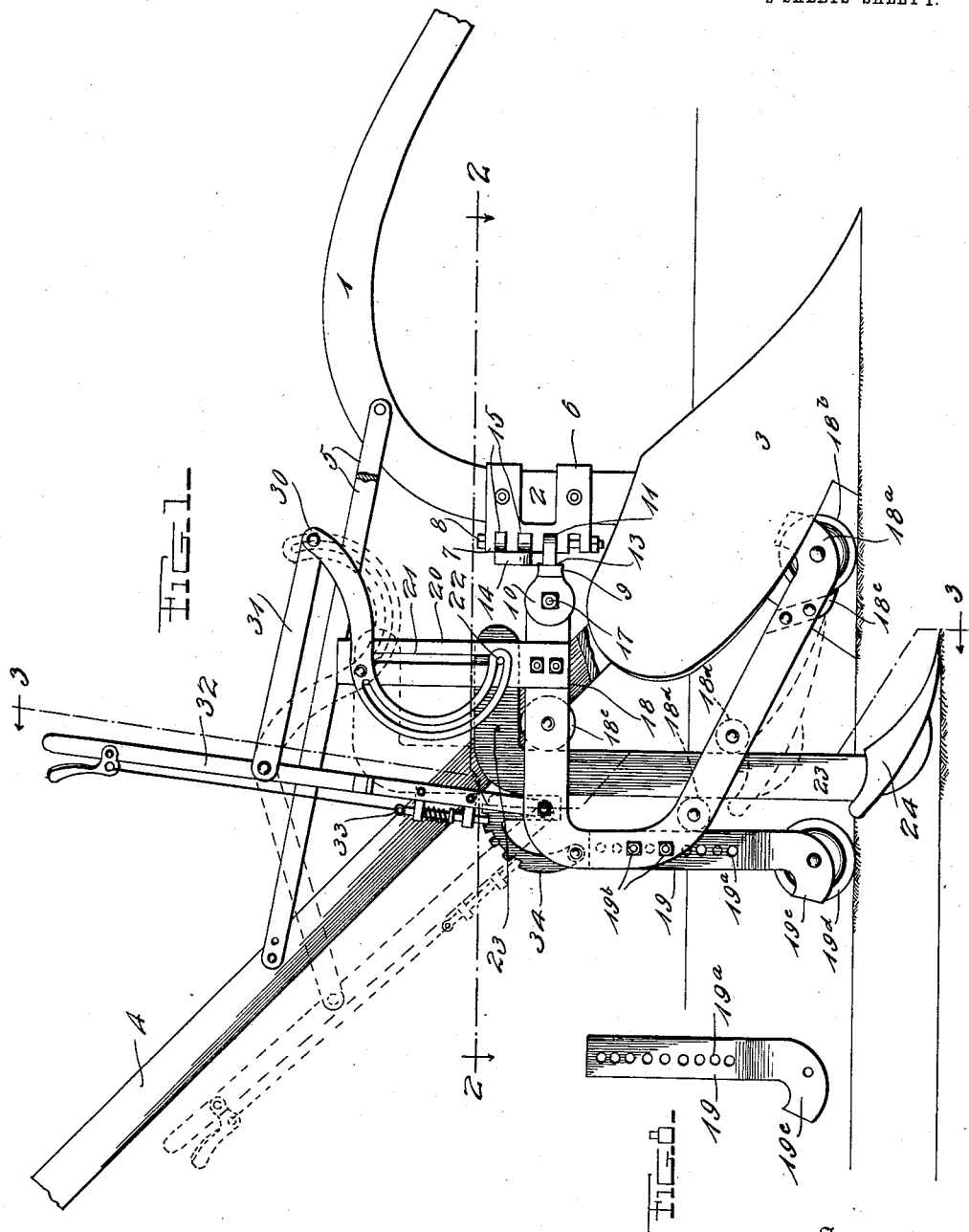

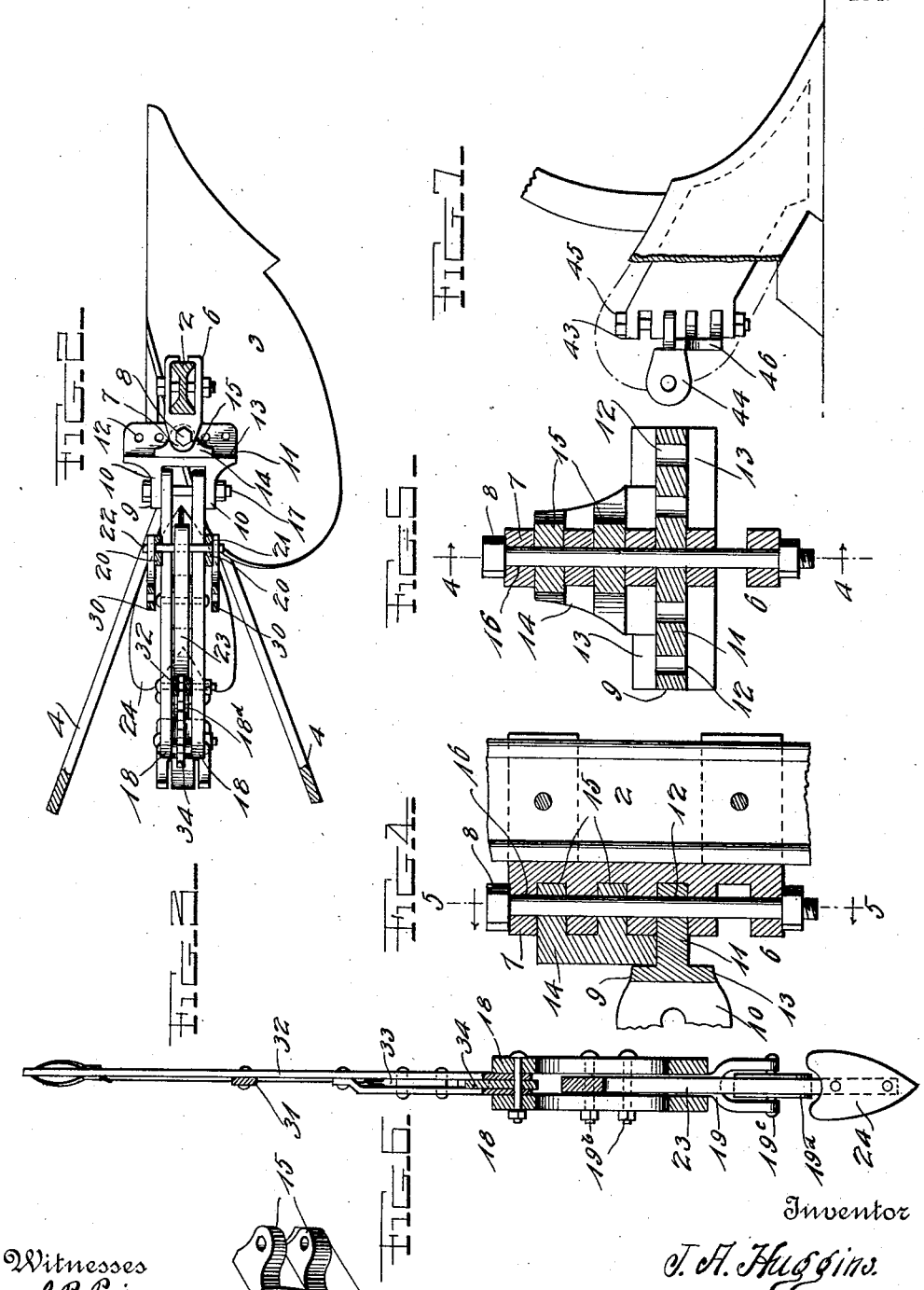

JAMES ALLEN HUGGINS, OF RED SPRINGS, NORTH CAROLINA.

SUBSOIL-PLOW ATTACHMENT.

1,033,245.  Specification of Letters Patent.  Patented July 23, 1912.

Application filed September 28, 1911. Serial No. 651,726.

*To all whom it may concern:*

Be it known that I, JAMES ALLEN HUGGINS, a citizen of the United States, residing at Red Springs, in the county of Robeson and State of North Carolina, have invented certain new and useful Improvements in Subsoil-Plow Attachments; and I do declare the following to be a full, clear, and exact description of the invention, such as will enable others skilled in the art to which it appertains to make and use the same.

This invention relates to improvements in subsoil attachments for plows.

One object of the invention is to provide a subsoil plow having an improved means for removably and adjustably attaching the same to an ordinary plow whereby the subsoil plow will travel immediately behind and in the furrow formed by the turning plow thus working or loosening up the subsoil without turning the same.

Another object is to provide an improved means for adjusting and lifting the subsoil plow out of engagement with the ground.

With these and other objects in view, the invention consists of certain novel features of construction, combination and arrangement of parts as will be more fully described and claimed.

In the accompanying drawings:—Figure 1 is a side view of a plow showing the application of my improved subsoil plow attachment and illustrating the parts lowered or in an operative position in full lines and in a raised or inoperative position in dotted lines; Fig. 2 is a vertical sectional view on the line 2—2 of Fig. 1; Fig. 3 is a horizontal sectional view on the line 3—3 of Fig. 1; Fig. 4 is a vertical sectional view through the clevis attaching clip of the subsoil plow taken on the line 4—4 of Fig. 5; Fig. 5 is a vertical sectional view taken at right angles to and on the line 5—5 of Fig. 4; Fig. 6 is a detail perspective view of the plate for engaging the clevis and holding the latter and the subsoil plow from careening or tilting sidewise when in use; Fig. 7 is a detail side view partly in section of a portion of a plow showing a modified construction and arrangement of the clevis attachment of the plow; Fig. 8 is a detail side view of the rear adjustable member of the supporting wheel standard.

Referring more particularly to the drawings, 1 denotes the beam and 2 the integral standard of an ordinary turning plow. To the lower end of the standard 2 is secured the ordinary or any suitable form of turning or mold board plow 3. To the plow 3 and lower end of the standard are secured suitable handles 4. The handles are adjustably connected to the beam 1 of the plow by brace bars 5.

Bolted or otherwise firmly secured to the standard 2 is a clevis attaching clip 6. The clip 6 is provided on its rear edge with a series of spaced apertured ears 7 or shoulders with which is engaged a clevis attaching bolt 8. Adapted to be engaged with one of the spaces between the ears 7 is a clevis 10, said clevis comprising a pair of parallel vertically disposed apertured lugs 10 and a horizontally disposed attaching plate 11 of a suitable thickness for closely fitting between the ears 7 of the clip, said plate 11 having formed therein a series of bolt holes 12 with one of which is adapted to be engaged the bolt 8 whereby the clevis may be secured to the clip and adjusted both horizontally and vertically. It will be noted that the plate 11 of the clevis is of less thickness than the lugs 9 thus forming an abrupt shoulder 13. This shoulder is provided to engage the lower edge of a clevis bracing and holding block 14 which has formed thereon attaching lugs 15 adapted to be inserted between the ears 7 of the clip 6 in which position it is firmly held by the bolt 8 which is inserted through the bolt holes 16 of the ears 7. When thus arranged the lower edge of the plate 14 rests on the plate 11 of the clevis and engages the shoulder 13 thereby preventing the clevis from twisting or tilting on the clip and holding the subsoil plow against careening when the latter is attached to the clevis as will be hereinafter described.

Pivotally connected to the lugs 10 of the clevis by a connecting bolt 17 is a supporting wheel standard 18 which consists of a main member comprising a pair of bars having their rear ends bent downwardly and forwardly, said forwardly projecting portion of the bars being formed at an angle and terminating at their forward ends near the surface of the ground, said ends being turned upwardly to a slight extent to form runners 18ª. Revolubly mounted in the forward ends or runners 18ª is a supporting wheel 18ᵇ. Secured to the bars of the standard 18 adjacent to the wheel 18ᵇ is a cleaning blade or scraper 18ᶜ which is adapted to engage the periphery of the wheel 18ᵇ and thus remove any dirt or foreign matter which may collect on the wheel. Between the downwardly projecting rear portion of the bars is a rear wheel standard member 19 comprising vertically disposed bars having therein series of bolt holes 19ᵃ with which when the member 19 is engaged between the rear portions of the main wheel standard are adapted to be engaged fastenings bolts 19ᵇ whereby said rear member of the standard is adjustably secured to the main member. The lower ends of the bars 19 are bent rearwardly to form runners 19ᶜ between which is revolubly mounted a rear supporting wheel 19ᵈ. By thus constructing the rear member of the beam it will be seen that said member may be readily adjusted to bring the wheel 19ᵈ below the level of the wheel 18ᵇ when desired.

To the outer sides of the upper or forward ends of the bars forming the standard 18 is secured the lower ends of longitudinally slotted pivot plates 20. Slidably engaged with the slots 21 in the pivot plates 20 is a plow attaching bolt 22 to which is pivotally connected the right angularly formed upper end of a subsoil plow standard 23 to the lower end of which is secured a subsoil plow 24. The upper end of the standard 23 of the subsoil plow is disposed between the bars of the supporting wheel standard 18 and the plates 20 as shown. By thus attaching the standard 23 of the plow with the pivot plates 20, said plow may be adjusted to plow more or less deeply or may be lifted entirely out of engagement with the ground.

Revolubly mounted between the lower forwardly projecting portion of the bars of the supporting wheel standard 18 are guide rollers 18ᵈ while between the upper forwardly extending portion of the bars of said standard is revolubly mounted a guide roller 18ᵉ. The rollers 18ᵈ and 18ᵉ are arranged in the standard 18 in position to engage the front and rear edges of the plow standard 23 as shown, whereby the latter will be held in position and guided in its movements when raised and lowered by a suitable attaching mechanism hereinafter described. In order to thus adjust and lift the subsoil plow I provide a suitable lifting or adjusting mechanism comprising a pair of cam levers 30 pivotally connected to the upper end of the plates 20 and having curved slotted lower ends slidably engaged with the attaching bolt 22 which pivotally connects the front end of the standard 23 with the slotted plates 20. The upper ends of the cam levers 30 are operatively connected by a link or connecting rod 31 with a hand lever 32 which is pivotally connected to the standard 18 as shown. The hand lever 32 projects upwardly between the handles of the main plow and has its upper end arranged within convenient reach of the operator. The lever is provided with a spring projected pawl 33 which is adapted to engage a segmental rack 34 on the upper portion of the standard 18 whereby the lever is locked and the parts actuated thereby are held in their adjusted positions. By thus arranging the hand lever 32 and connecting the same with the cam levers 30 these parts may be readily actuated for adjusting the subsoil plow or for lifting the latter entirely out of the ground. By arranging the subsoil plow and connecting the same to the main plow as herein shown and described the subsoil plow will travel in the furrow formed by the point of the main plow and will loosen up the subsoil in the bottom of the furrow without turning said soil, thereby materially facilitating the cultivation of the soil. By providing the runners 18ᵃ and 19ᶜ on the lower ends of the bars of the wheel standard the supporting wheels thereof may be removed and the standard supported on the runners.

In Fig. 7 of the drawings is shown a slightly modified construction and arrangement of the clevis attaching mechanism, said mechanism being shown in this instance as comprising a series of parallel apertured lugs 43 which are formed integral with the foot of the main plow as shown. Adapted to be engaged with the lugs 43 is a clevis 44 which is constructed in the same manner as the clevis 9 shown in the first form of the invention and a further description of this clevis is not thought to be necessary. The clevis 44 is secured in engagement with the lug 43 by a pivot bolt 45 and the clevis is braced by a bracing plate or block 46 corresponding to the bracing plate or block 14 of the clevis 9. The bracing block or plate 46 may be arranged above or below the clevis and is shown in the present instance as being engaged with the under side of the same. To the clevis 44 is connected the forward end of the supporting wheel standard, said standard being connected and arranged in the same manner as described in connection with the first form of the attachment.

While the invention is herein shown and described as an attachment for plows, it is obvious that the same may be employed as a subsoil plow independent of or separately from a regular plow.

From the foregoing description, taken in connection with the accompanying drawings the construction and operation of the invention will be readily understood without requiring a more extended explanation.

Various changes in the form, proportion and the minor details of construction may

Having thus described my invention, what I claim is:

1. A subsoil attachment for plows comprising a supporting wheel standard, supporting wheels revolubly mounted in the lower ends of said standard, a clevis pivotally connected to the upper ends of the standard, means to adjustably connect said clevis to the standard of the plow whereby said supporting wheel may be adjusted vertically and horizontally, a subsoil plow standard having its upper end loosely connected with the upper portion of said supporting wheel standard, and a subsoil plow connected to the lower end of said plow standard.

2. A subsoil plow attachment for plows comprising a supporting wheel standard, a clevis attaching clip secured to the main plow, a clevis adjustably secured to the clip, means whereby the supporting wheel standard is pivotally connected to the clevis, pivot plates secured to the forward end of the supporting wheel standard, a subsoil plow standard having a sliding connection at its upper end with said plates, a subsoil plow secured to the lower end of said standard, and means whereby said sub-soil plow standard and plow are adjusted.

3. A subsoil attachment for plows comprising a supporting wheel standard, means to pivotally and adjustably connect the upper end of said standard with the standard of the main plow, pivot plates secured to said wheel standard, said plates having longitudinal slots formed therein, a subsoil plow standard having a pivot bolt adapted to slidably engage the slots in said plates, cam levers pivotally mounted on said plates and having curved slots adapted to engage the pivot bolt in the plow standard, and means for moving said levers whereby the standard may be raised and lowered.

4. A subsoil attachment for plows comprising a supporting wheel standard, means to pivotally and adjustably connect the upper end of said standard with the standard of the main plow, pivot plates secured to the upper end of said wheel standard, said plates having longitudinal slots formed therein, a subsoil plow standard having in its upper end a pivot bolt adapted to slidably engage the slots in said plates, cam levers pivotally mounted on said plates, said levers having curved slotted lower ends adapted to engage the pivot bolt in the plow standard whereby the standard may be raised and lowered by said cam levers, and an operating lever connected to said cam levers.

5. A sub-soil attachment for plows comprising a supporting wheel standard, means to adjustably connect said standard with the standard of the main plow, pivot plates secured to the upper end of said wheel standard, said plates having longitudinal slots formed therein, a sub-soil plow standard having in its upper end a pivot bolt adapted to slidably engage the slots in said plates, cam levers pivotally mounted on said plates and having slots adapted to engage the pivot bolt in the plow standard, guide rollers revolubly mounted in said supporting wheel standard whereby said sub-soil plow standard is guided in its movements, a hand lever pivotally connected to said wheel standard, and means to connect said hand lever with said cam levers.

6. A subsoil attachment for plows comprising a supporting wheel standard, means to pivotally and adjustably connect the upper end of said standard with the standard of the main plow, pivot plates secured to the upper end of said wheel standard, said plates having longitudinal slots formed therein, a subsoil plow standard having in its upper end a pivot bolt adapted to slidably engage the slots in said plates, cam levers pivotally mounted on said plates, said levers having curved slotted lower ends adapted to engage the pivot bolt in the plow standard whereby the standard may be raised and lowered by said cam levers, guide rollers revolubly mounted in said supporting wheel standard whereby said sub-soil plow standard is guided in its movements, a hand lever pivotally connected to said wheel standard, a link to connect said hand lever with said cam levers a segmental rack arranged on said wheel standard, a spring projected locking pawl carried by said hand lever and adapted to engage said rack whereby said plow adjusting mechanism is locked to hold the subsoil plow in its adjusted positions, and a hand operated pawl releasing lever operatively connected with said pawl whereby the latter may be disengaged from said rack to release said adjusting mechanism.

7. In a sub-soil plow attachment for plows, a supporting wheel standard comprising a main member consisting of a pair of bars having their rear ends bent downwardly and forwardly, a rear standard member adjustably connected with the bars of the main member, runners formed on said members, supporting wheels revolubly mounted between said runners, and a wheel cleaning blade secured to the bars of the main member; combined with a sub-soil plow standard arranged between and having a sliding engagement with said bars, means to connect said supporting wheel standard with the main plow beam whereby said standard may be adjusted vertically and horizontally, means to adjust said sub-soil plow standard in said supporting wheel standard, and a sub-soil plow secured to the lower end of the subsoil plow standard.

8. In a subsoil plow attachment for plows a supporting wheel standard, said standard comprising a main member consisting of a pair of parallel horizontally disposed bars having their rear ends bent downwardly and forwardly, a rear standard member comprising a pair of parallel bars having an adjustable connection with the bars of the main member of the standard, runners formed on the ends of said main and rear standard members, supporting wheels revolubly mounted between said ends or runners of the members, a wheel cleaning blade secured to the bars of the main member of the standard whereby the supporting wheel therein is cleaned, upper and lower guide rollers revolubly mounted between the bars of said main standard, a subsoil plow standard arranged between said bars and having a sliding engagement with said rollers, means to connect said supporting wheel standard with the main plow whereby said standard may be adjusted vertically and horizontally, means to adjust said subsoil plow standard in said supporting wheel standard, and a subsoil plow secured to the lower end of the subsoil plow standard.

In testimony whereof I have hereunto set my hand in presence of two subscribing witnesses.

JAMES ALLEN HUGGINS.

Witnesses:
J. M. BLACK,
JOHN T. McNEILL.

Copies of this patent may be obtained for five cents each, by addressing the "Commissioner of Patents, Washington, D. C."